Figure 1:
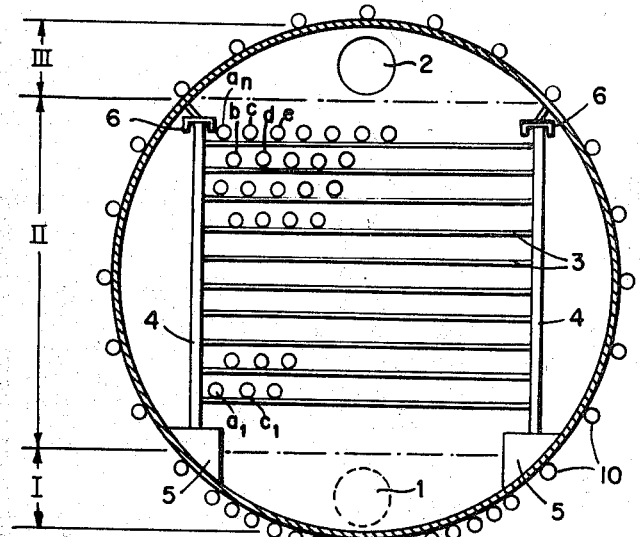

United States Patent

[11] 3,559,723

[72] Inventors Walter Mann
Lampertheim;
Joachim Wagner, Ludwigshafen; Werner
Jaeger, Mannheim, Germany
[21] Appl. No. 772,212
[22] Filed Oct. 31, 1968
[45] Patented Feb. 2, 1971
[73] Assignee Badische Anilin- & Soda-Fabrik
Aktiengesellschaft
Ludwigshafen (Rhine) Rhineland-Pfalz,
Germany
[32] Priority Nov. 3, 1967
[33] Germany
[31] P1,619,841

[54] SEPARATING SUBLIMATION PRODUCTS FROM GASES
2 Claims, 2 Drawing Figs.

[52] U.S. Cl................................................... 165/2, 165/48

[51] Int. Cl................................................ F25b 13/00
[50] Field of Search.................................. 165/97, 1, 2, 48, 111, 64

[56] References Cited
UNITED STATES PATENTS
3,084,914 4/1963 Davis............................ 165/97

Primary Examiner—Charles Sukalo
Attorney—Johnston, Root, O'Keeffe, Keil, Thompson & Shuntleffe ABSTRACT: Separating sublimation products from gases in nested tube separators having heat exchange in the interior of the separator as well as from the outer wall, the outer wall being kept, during the sublimation and melting out of the sublimation product, substantially constantly at a temperature which is somewhat above the melting point of the sublimation product; in the corresponding apparatus, the heat exchange system for the interior and that for the exterior of the separator are separate from each other.

PATENTED FEB 2 1971

3,559,723

INVENTORS:
WALTER MANN
JOACHIM WAGNER
WERNER JAEGER
BY
Marzall, Johnston, Cook & Root
ATT'YS

SEPARATING SUBLIMATION PRODUCTS FROM GASES

The present invention relates to a new process and a new apparatus for separating sublimation products from gases and to a method of preparing the said apparatus.

In order to separate sublimate products from gases, for example phthalic anhydride from hot gas mixtures from the oxidation of oxylene or naphthalene, separators are used which have the shape of a parallelepiped or horizontal cylinder having oval or elliptical cross section, the longer axis of the cross-sectional shape being vertical. This parallelepiped or cylinder (hereinafter both included in the term cylinder for simplicity) is subdivided into three zones, one zone arranged above the other. Hot gas is passed through the lower portion of one of the end walls into the lowermost zone whence it disperses and ascends, is freed in the middle separating zone from the sublimation product, then collects in the upper zone and leaves the separator through an outlet provided in the upper portion of the other end wall of the cylinder.

A number of tubes parallel to the casing of the cylinder and extending for almost the full length of the cylinder are located in the separating zone; they are perpendicular to the end walls and pass through them. These tubes, which have a heat-exchange medium flowing through them and which are provided with fins (usually vertical) to increase the heat-exchange surface area, form the separation zone. The tubes, which rest on grids of parallel rod-shaped supports, are shaped like hairpins, i.e. a tube passing through one end wall at a given point first traverses almost the whole length of the cylinder, turns vertically through 180° downwards, traverses the length of the cylinder in the reverse direction and passes through the end wall directly below its point of entry. Since these nests of tubes originate from both end walls, the tube system is composed of hairpins placed in opposite directions to each other.

In addition to heat exchange through the nested tube system in the interior of the separator, heat exchange also takes place at the surface of the casing of the cylinder and in fact for all three zones and the nest of tubes by means of a single circulation system. In principle the end of a hairpin pipe passing out through an end wall is connected to the end of a hairpin pipe passing out through the other end wall by means of a pipe passing along the outside of the wall of the cylinder, and so forth.

The separator is intermittently cooled and heated during operation. During the cooling phase, the material being sublimed is deposited on the fins of the nest of tubes and on the inner wall of the cylinder. When enough solid has formed, heating is carried out by means of the same heat exchanger system so that the solid melts, collects in the lower zone of the separator and is withdrawn therefrom.

The variations in temperature and consequent expansion and stress in the material of the apparatus occasioned by the intermittent operation are a disadvantage in such an apparatus. These stresses can be absorbed fairly well by the hairpin tubes of the nested tube system, because the expansion or the tendency to expand in the direction of the tubes is mainly linear but this is not true of the cylindrical casing of the separator. The stress on the material is so great here that cracks may even form, especially at welds.

The present invention therefore has for its object to provide a method and apparatus for the separation of sublimation products from gases which are better both industrially and economically. It is a further object of the invention to provide such an apparatus which is economical to make.

We have now found a process for the separation of sublimation products from gases by means of nested tube separators in which heat exchange takes place by means of the tubes and at the outer walls of the separator, the separation being effected intermittently by (a) cooling and (b) melting and discharge of the sublimation product by heating, wherein the outer wall of the separator is maintained throughout the whole operation at a temperature which is substantially constant and is somewhat above the melting point of the sublimation product.

As a consequence of the process according to the invention, in which only the nested tubes in the interior of the separator are alternately cooled and heated, the two heat exchanger circulation systems may be separate so that the construction of the apparatus is considerably simplified, safety in operation is increased and maintenance costs are decreased.

Apparatus for separating sublimation products from gases for carrying out the process according to the invention which comprises a parallelepiped or a horizontal cylinder having oval, elliptical or circular cross section through whose casing heat exchange can take place, and a system of heat exchanger tubes grouped around the central longitudinal section, the path of the gas from the lower portion of the parallelepiped or cylinder being through the nested tube zone into the upper portion, is characterized by the fact that the system of the nested tube heat exchange is separate from that of the heat exchange of the surface of the casing.

Figure 2:
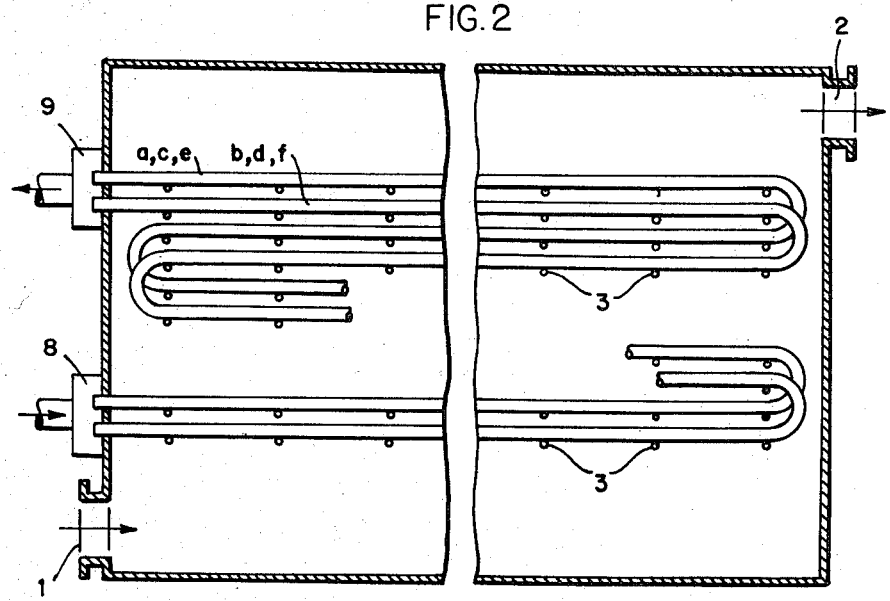

A particularly advantageous embodiment of the apparatus according to this invention is shown diagrammatically in cross section through the separator in FIG. 1 and in longitudinal section through the separator in FIG. 2.

The cylindrical casing of the separator, which is subdivided into zones I, II and III, has a circular cross section. The gas passes through inlet 1 into the lower zone I, rises vertically upwards, flows through the nested tube exchanger system of the separator zone II where it is freed from sublimation product, collects in the upper zone III and leaves this through outlet 2.

The tubes of the nest of tubes rest on a number of rods 3 which in turn are held in the two supporting walls 4. This system is secured to a supporting construction 5 which is mounted on the casing of the separator and either secured thereto or (if 5 is itself stable) loosely connected therewith. The supporting walls 4 do not abut against the casing of the separator but each is loosely held in a rail 6 so that expansions caused by variations in temperature can be absorbed. In the gap between 4 and 6 there is an elastic seal 7 (not shown) which prevents passage of the gas into the interspace between 4 and the casing of the separator.

The tubes form groups $a$, $b$, $c$, and so on which are parallel to each other and which are staggered so that the space is filled better. One nest of tubes $a$ consists of a tube winding backwards and forwards and which passes through the front end wall twice, at the entry $a_1$ and at the outlet $a_n$. The same is true of the tubes $b$, $c$ and so on. The inlets $a_1$, $b_1$ and so on and the outlets $a_n$, $b_n$ and so on are connected to headers 8 and 9 between which are connected the circulating pump and the heating and cooling means for the heat exchange medium (not shown). Naturally the circulation of the heat exchange medium may also be such that it enters at $a_n$, $b_n$ and so on and leaves the apparatus at $a_1$, $b_1$ and so on.

The casing of the separator is kept at a constant elevated temperature in accordance with this invention through tubes 10. Since more heat is required for the melting process of the intermittent operation in which the sublimation product collects in zone I than is required in the offgas zone III (in which simply condensation of other components of the gas, for example water, is prevented) the tube system is denser in the region of zone II or III. The tubes 10 all belong to one heat circulation system.

The heating of the casing is preferably carried out with steam and the nested tube heat exchangers in the separation and melting zones preferably with oil whose relatively low heat capacity provides for smooth temperature transitions. The system water/steam is also suitable for the heat exchange medium for the separating zone.

Those parts of the apparatus which are also contained in conventional equipment for separation having the same kind of arrangement in principle, for example discharge pipes for the melt, manholes and the like are not shown. The dimensions of the separator according to this invention and the number and shape of the tubes are not critical for the invention and correspond to the state of the art.

The construction of the separator according to this invention, also in the preferred embodiment described, may be carried out conventionally. The straight sections of the tubes may be laid over the support rods already mounted in the separator and the ends of the tubes may be welded together through bends. This installation is laborious and time-consuming, however, because it has to be carried out on the spot, i.e. inside the casing and hindered by the support construction and the tubes.

We have therefore developed a convenient method for making the apparatus according to this invention which comprises laying one of the support walls which later is to be vertical in a horizontal position, securing the support rods thereto (the system resembling a number of parallel combs) and the prefabricated assembled coils of tubing being brought into position from the top (with spacers providing for the necessary spacing), the free ends of the support rods are then secured in the other supporting wall, the construction thus obtained consisting of a nested tube system of tubes and supports is turned through 90° into the operational position, the entire construction is introduced into the casing of the separator, fixed in position therein and the separator finished off in the conventional way.

It is in contradiction to previous conceptions that the separator for sublimation products works reliably and without loss of yield when the casing of the separator is constantly heated during the separation process, i.e. when the separation zone is cooled.

This prejudice has been overcome by the invention and the separator resulting therefrom is much more simply constructed and works more reliably because stresses in the casing caused by change in temperature are practically eliminated. Furthermore, operating with two separate heat-exchange cycles is more flexible so that this type of separator can be used without difficulty for the separation of different sublimation products from gases having different compositions without modification or new construction being necessary in each case.

Finally the production of the separator according to this invention is not only particularly convenient but also more reliable because all welded parts of the nested tube system are easily accessible and a control of the quality of the welds is greatly facilitated.

We claim:

1. A process for separating sublimation products from gases by means of a nested tube separator which comprises: passing said gases through said separator and in contact with said nested tubes; passing coolant through said nested tubes to form said sublimation products and simultaneously heating the entire surface of the external walls of said separator to maintain a substantially constant wall temperature which is slightly above the melting point of said sublimation products, whereby stress on said external walls caused by intermittent expansion during said process is avoided.

2. A process as claimed in claim 1, wherein heat exchange at the outer wall of the separator is carried out with steam and heat exchange in the nest of tubes in the interior of the separator is carried out with oil.